May 28, 1968 J. W CROOKS 3,385,134
TRANSMISSION MECHANISM
Filed Dec. 13, 1965
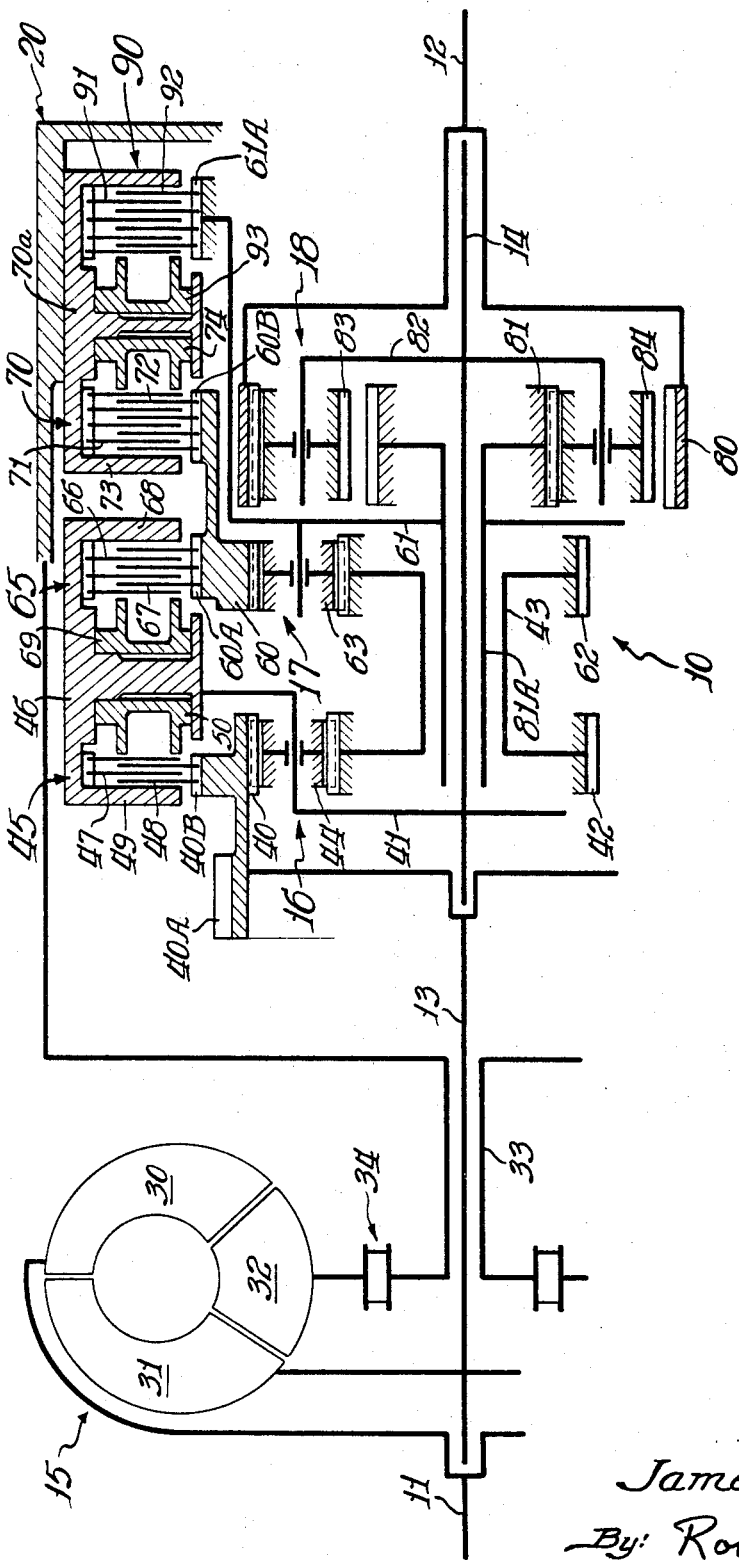
Inventor:
James W. Crooks
By: Robert L. Zieg Atty.

United States Patent Office 3,385,134
Patented May 28, 1968

3,385,134
TRANSMISSION MECHANISM
James W. Crooks, Muncie, Ind., assignor to Borg-Warner
Corporation, Chicago, Ill., a corporation of Illinois
Filed Dec. 13, 1965, Ser. No. 513,437
5 Claims. (Cl. 74—759)

ABSTRACT OF THE DISCLOSURE

An improved automatic transmission mechanism providing five forward driving ratios through a planetary gear train in which each ratio is established by selective engagement of two friction devices of the overall four in the transmission and in which the planetary gear sets are connected in such a manner that each shift from one ratio to the next is made by releasing only one of the engaged friction devices engaging another at no time necessitating releasing both engaged friction devices and engaging two different ones.

---

The invention consists of the novel constructions, arrangements and devices to be hereinafter described and claimed for carrying out the above stated objects and such other objects as will appear from the following description of the preferred embodiment of the invention illustrated with reference to the accompanying drawing wherein a cross sectional view through a transmission embodying the principles of the invention is shown.

Referring particularly to the figure, the transmission mechanism 10 includes an input shaft 11, an output shaft 12, a first intermediate shaft 13, a second intermediate shaft 14, a torque converter 15, a first planetary gear set 16, a second planetary gear set 17, and a third planetary gear set 18. The input and output shafts, the intermediate shafts, and the planetary gear sets are mounted within a casing 20.

The torque converter 15 includes a pump or impeller 30 connected to be driven by input shaft 11, a turbine 31 drivingly connected to the first intermediate shaft 13 and a stator or reaction member 32. A hollow shaft 33 is provided to the casing 20, a one-way brake mechanism 34 is provided mounted between the stator 32 and the stationary hollow shaft 33.

The first planetary gear set 16 includes a ring gear member 40 drivingly connected to the first intermediate shaft 13, a planetary gear carrier 41 drivingly connected to the second intermediate shaft 14, and a sun gear 42 which is formed on a hollow shaft 43 which is concentric with the second intermediate shaft 14. Mounted on the planetary carrier 41 are a plurality of pinion gears 44 which intermesh with ring gear 40 and sun gear 42. The planetary carrier 41 is drivingly connected to a clutch drum 46.

A clutch mechanism 45 is provided for the first planetary gear set. A plurality of inner-leaved clutch discs 47 and 48 are provided which interconnect the clutch drum 46 and the ring gear 40. The ring gear 40 has two sets of spline teeth 40A and 40B thereon. Clutch discs 47 are splined to the clutch drum 46 and clutch discs 48 are splined to the ring gear teeth 40B, clutch mechanism 45 includes a stationary back-up plate 49 and a piston 50. When the piston is moved to the left by fluid pressure, clutch 45 will be engaged to drivingly connect planetary carrier 41 and the ring gear 40 thus locking up the first planetary gear set in a 1:1 driving ratio.

The second planetary gear set 17 includes a ring gear 60 having two sets of spline teeth 60A and 60B thereon, a planetary carrier 61, and a sun gear 62. Mounted on the planetary carrier 61 are a plurality of pinion gears 63 meshing with the sun gear 62 and the ring gear 60. The sun gear 62 is integral with the hollow shaft 43.

A clutch 65 is provided which includes a plurality of inner-leaved clutch discs, discs 66 being splined to the clutch drum 46 and discs 67 splined to the ring gear teeth 60A. A stationary back-up plate 68 is provided for the clutch 65 and the clutch 65 further includes a piston 69. Fluid pressure will urge piston 69 to the right to engage the clutch drum 65 and drivingly connect the clutch drum 46 with ring gear 60 of planetary gear set 16.

A brake mechanism 70 is provided for the second planetary gear set 17 which includes a plurality of inner-leaved friction discs, discs 71 are splined to a stationary drum case 70A fixed to case 20 and discs 72 are splined to the ring gear teeth 60B. A stationary back-up plate 73 and a piston 74 are provided for brake 70. Fluid pressure acting on piston 74 will move to the left as viewed in the figure to engage brake 70 to hold the ring gear 60 stationary.

The third planetary gear set 18 includes a ring gear 80, a sun gear 81 and a planetary carrier 82. Mounted on the planetary carrier 82 are two sets of intermeshing pinion gears 83 and 84. Pinion gears 83 mesh with ring gear 80 and pinion gears 84 mesh with the sun gear 81. The sun gear 81 is integral with a hollow shaft 81A coaxial with and encircling second intermediate shaft 14 and is drivingly connected to planetary carrier 61 of the planetary gear set 17. The ring gear 80 is drivingly connected to the output shaft 12. The planetary carrier 82 is drivingly connected to the second intermediate shaft 14.

A brake mechanism 90 is provided for planetary gear sets 17 and 18. A set of external splines 61A are provided on planetary carrier 61. Brake 90 includes a plurality of inter-leaved discs, discs 91 being splined to the stationary drum 70A and discs 92 being splined to the planetary carrier teeth 61A and thereby to the sun gear 81 of planetary gear set 18. A piston 93 is provided which can be moved to the right by fluid pressure to frictionally engage discs 91 and 92 thereby holding planetary carrier 61 and sun gear 81 stationary.

By selective actuation of the clutch and brake mechanism of the transmission five forward driving ratios, reverse and neutral may be obtained in accordance with the following table:

|   | C1 | C2 | B1 | B2 |       |
|---|----|----|----|----|-------|
|   | 45 | 65 | 70 | 90 | Ratio |
| N |    |    |    |    |       |
| R |    | X  | X  |    | 3.78  |
| 1 |    | X  |    | X  | 4.97  |
| 2 |    |    | X  | X  | 3.00  |
| 3 | X  |    |    | X  | 1.83  |
| 4 | X  |    | X  |    | 1.40  |
| 5 | X  | X  |    |    | 1.00  |

In the operation of the above-described transmission neutral driving ratio will exist when none of the friction elements are engaged.

First driving ratio is obtained by application of clutch 65 and brake 90. Impeller 30 is driven by the engine shaft 11 and will thus drive turbine 31. Turbine 31 through shaft 13 drives ring gear 40 of planetary gear set 16. Rotation of ring gear 40 will tend to drive planetary carrier 41 and thus clutch drum 46, and will also tend to drive sun gear 42. Rotation of clutch drum 46 will drive ring gear 60 of gear set 17 since clutch 65 is engaged. Since planetary carrier 61 is held stationary by brake 90, the drive imparted to ring gear 60 will drive sun gear 62 at an increased speed ratio with respect to ring gear 60 in the opposite direction from the drive of ring gear 60.

Sun gear 62 will then tend to drive sun gear 42 of planetary gear set 16 in the reverse direction at an increased speed with respect to the speed or r.p.m. of ring gear 40 and in the opposite direction to rotation of ring gear 40 thereby driving planetary carrier 41 of the planetary gear set 16 in the forward direction at a reduced ratio which in turn drives intermediate shaft 14. Intermediate shaft 14 drives planetary carrier 82 of the planetary gear set 18. Since sun gear 81 of planetary gear set 18 is held stationary by brake 90 the ring gear 80 will be rotated in the same direction as planetary carrier 82 at a reduced ratio thereby driving output shaft 12. Thus a reduced drive of approximately 5:1 may be obtained through application of clutch 65 and brake 90 since a reduced drive ratio is obtained by utilization of the gear ratios available from all three planetary gear sets 16, 17 and 18.

Second speed ratio is obtained by application of brake 70 and brake 90. Application of brakes 70 and 90 holds ring gear 60 and planetary carrier 61 of planetary gear set 17 stationary. Thus sun gear 62 will be held stationary (since no relative rotation can occur in gear set 17) and thereby shaft 43 and sun gear 42 of the front planetary gear set 16 will be held stationary.

Sun gear 81 of planetary gear set 18 will also be held stationary by brake 90 with ring gear 40 being driven in the forward direction by turbine 31 and sun gear 42 held stationary a reduced forward drive will be imparted to planetary carrier 41 and intermediate shaft 14 thereby to planetary carrier 82 of planetary gear set 18. Forward drive of planetary carrier 82 will impart a further reduced drive to ring gear set 80 and thus output shaft 12 in the forward direction since sun gear 81 is stationary. The ratio obtained by engagement of brake 70 and brake 90 is less than that obtained in first ratio since sun gear 42 is merely held stationary and not rotated in the opposite direction of ring gear 40 as was the case in first ratio.

Third drive ratio is obtained by engagement of clutch 45 and brake 90. Engagement of clutch 45 drivingly interconnects ring gear 50 and planetary carrier 41 of planetary gear set 16 thus locking up gear set 16 and producing a 1:1 drive of hollow shaft 43 and intermediate shaft 14. Planetary carrier 61 is held stationary and ring gear 60 is at this time unconnected since clutch 65 and brake 70 are not engaged, therefore hollow shaft 43 will merely drive ring gear 60 having no connection with driving the vehicle. Drive of the intermediate shaft 14 in the forward direction will impart a forward driving ratio at a reduced rate through gear set 18 by driving ring gear 80 in the forward direction since sun gear 81 is held stationary. Thus in third driving ratio the overall gear ratio is reduced since only the gear reduction of the rear planetary set 18 is utilized.

Fourth drive ratio is established by engagement of clutch 45 and brake 70. Engagement of clutch 45 locks ring gear 30 to planetary carrier 41 thus locking up planetary gear set 16 which drives hollow shaft 43 and intermediate shaft 14 in the forward direction at a 1:1 ratio. Since brake 70 is engaged ring gear 60 of planetary gear set 17 will be held stationary. Since sun gear 62 is being driven in the forward direction with ring gear 60 held stationary planetary carrier 61 will be rotated in the forward direction at a reduced ratio. Sun gear 81 of planetary gear set 18 will thus be driven in the forward direction at a reduced drive ratio. Intermediate shaft 14 will drive carrier 82 of planetary gear set 18 at a 1:1 forward drive ratio as discussed above. With sun gear 81 driven at a reduced forward drive ratio and planetary gear carrier 82 driven at a 1:1 gear ratio the effect is to drive the ring gear 80 in a forward direction at a reduced drive ratio although the reduced drive ratio will be a lower numerical ratio then obtained in third forward drive ratio with sun gear 81 held stationary.

Fifth forward drive ratio is established by engagement of both clutches 45 and 65. Clutch 45 being engaged as previously discussed locks up planetary gear set 16 in a 1:1 drive ratio. With clutch 65 also applied the ring gear 60 of planetary gear set 17 will be driven at a 1:1 ratio and sun gear 62 of planetary gear set 17 will be driven at a 1:1 ratio through shaft 43 thus planetary gear set 17 is driven at a 1:1 ratio. Since sun gear 81 of planetary gear set 18 is connected to the carrier 61 of planetary gear set 17 and the planetary gear carrier 82 of planetary gear set 18 is connected to the planetary gear carrier 41 of planetary gear set 16 the sun gear 81 and the planetary carrier 82 are also at a 1:1 ratio thus producing a 1:1 ratio drive of output shaft 12 since all three gear sets are locked up in a 1:1 ratio.

Reverse drive ratio is established by engagement of clutch 65 and brake 70. With the brake 70 applied and clutch 65 applied the planetary carrier of planetary gear set 16 will be held against rotation. As the ring gear 40 is thus driven in the forward direction by the turbine 31 the sun gear 42 will be driven in the reverse direction at an increased drive ratio. Sun gear 42 will thus, through the medium of shaft 43, drive sun gear 62 of planetary gear set 17 in the reverse direction and with ring gear 60 held stationary by brake 70, planetary carrier 61 will thus be driven in the reverse direction at a reduced drive ratio. Planetary gear carrier 61 will thus drive sun gear 81 of planetary gear set 18 in the reverse direction at a reduced drive ratio. Planetary gear carrier 82 of planetary gear set 18 is held stationary through its connection with planetary gear carrier 41 of planetary gear set 16 through intermediate shaft 14. Since a double set of planetary pinion gears is utilized on planetary carrier 82 with the sun gear 81 rotating in the reverse direction, the output ring gear 80 will also be driven in the reverse direction at a reduced drive ratio and will thus drive output shaft 12 in the reverse direction.

From the above it will be apparent that a planetary transmission mechanism is provided wherein five forward drive datios and reverse ratio are obtainable while utilizing only two friction clutch elements and two friction brake elements in the transmission. The particular connections between the three planetary gear sets of the transmission are made in a novel manner so that more than one reduced drive ratio is obtainable through either the first planetary gear set 16 or the third planetary gear set 18.

Thus a simplified transmission has been provided due to the improved particular connections between the gear sets, and the number of friction elements normally necessary to establish five forward drive ratios and reverse has been significantly reduced.

Further, since as will be apparent from the shift pattern illustrated in the table above, with the improved transmission disclosed herein each shift made involves disengagement and engagement of only one of two engaged friction devices for each ratio. Thus shifts may be made smoother since the tendency for increase in engine r.p.m. is remedied because one friction element is always engaged and further a control system for the present improved transmission is simplified since precise timing, as would be required if both friction elements were changed during a shift, is unnecessary.

Various of the features of the invention have been particularly shown and described; however, it should be obvious to one skilled in the art that various modifications may be made therein without departing from the scope of the invention.

I claim:

1. A transmission mechanism comprising an input shaft, an output shaft, first second and third planetary gear sets interconnecting said shafts, each of said planetary gear sets including a plurality of intermeshed elements, a first intermediate shaft interconnecting elements of said first and second planetary gear sets, a second intermediate shaft interconnecting elements of said first and third gear sets, said input shaft connected to drive an element of said first planetary gear set, said output shaft connected to be driven by an element of said third planetary gear set, another element of said third gear set being connected to an element of said second gear set, a first clutch operatively associated with said first planetary gear set and engageable to drivingly connect two elements of said first gear set, a second clutch engageable to drivingly connect an element of said first gear set with an element of said second gear set, a brake engageable to hold stationary an element of said second gear set, a second brake engageable to hold stationary an element of said third gear set whereby a plurality of driving ratios may be established by selective engagement of said clutches and brakes.

2. A transmission mechanism as claimed in claim 1 wherein each of said clutches and brakes includes a plurality of friction disc elements.

3. A transmission as claimed in claim 1 wherein each of said planetary gear sets includes three intermeshed gear elements, said first intermediate shaft connecting a first element of said first planetary gear set with a first element of said second planetary gear set, said second intermediate shaft interconnecting a second element of said first planetary gear set with a first element of said third planetary gear set, said input shaft being connected to drive the third element of said first planetary gear set and said output shaft being connected to be driven by a second element of said third planetary gear set.

4. A transmission as claimed in claim 3 wherein said first clutch is engageable to drivingly interconnect said second and third elements of said first planetary gear sets, said second clutch being engageable to interconnect said second element of said first planetary gear set with a second element of said second planetary gear set, said first brake being engageable to hold stationary the second element of said second planetary gear set and said second brake being engageable to hold stationary said third element of said second planetary gear set.

5. A transmission as claimed in claim 1 wherein each of said planetary gear sets includes a sun gear, a ring gear, and a planetary carrier element; said first intermediate shaft interconnecting said planetary gear carrier elements of said first and third planetary gear sets; said second intermediate shaft interconnecting said sun gear elements of said first and second planetary gear sets; said input shaft being connected to drive the ring gear element of said first planetry gear set; said output shaft connected to be driven by the ring gear element of said third planetary gear set; said first clutch being engageable to drivingly interconnect the ring gear and planetary carrier of said first planetary gear set; said second clutch being engageable to interconnect the planetary carrier of said first planetary gear set with the ring gear of said second planetary gear set; said first brake element being engageable to hold stationary the ring gear of said second planetary gear set; and said second brake element being engageable to hold stationary the planetary gear carrier of said second planetary gear set whereby with selective engagement of two of said clutch or brake mechanisms a plurality of forward driving ratios may be established through said transmission.

References Cited

UNITED STATES PATENTS

| | | | |
|---|---|---|---|
| 1,717,097 | 6/1929 | De Normanville | 74—765 |
| 2,795,972 | 6/1957 | Cavallier | 74—759 |
| 2,799,184 | 7/1957 | Miller | 74—682 X |
| 2,822,706 | 2/1958 | Miller | 74—763 |
| 2,990,727 | 7/1961 | Miller | 74—759 |
| 3,097,544 | 7/1963 | Evernden | 74—761 X |

FOREIGN PATENTS 28,114 of 1912 Great Britain.

DONLEY J. STOCKING, *Primary Examiner.*

THOMAS C. PERRY, *Examiner.*